Oct. 6, 1953     C. K. HUTHSING     2,654,396
VALVE
Filed July 28, 1950     2 Sheets-Sheet 1
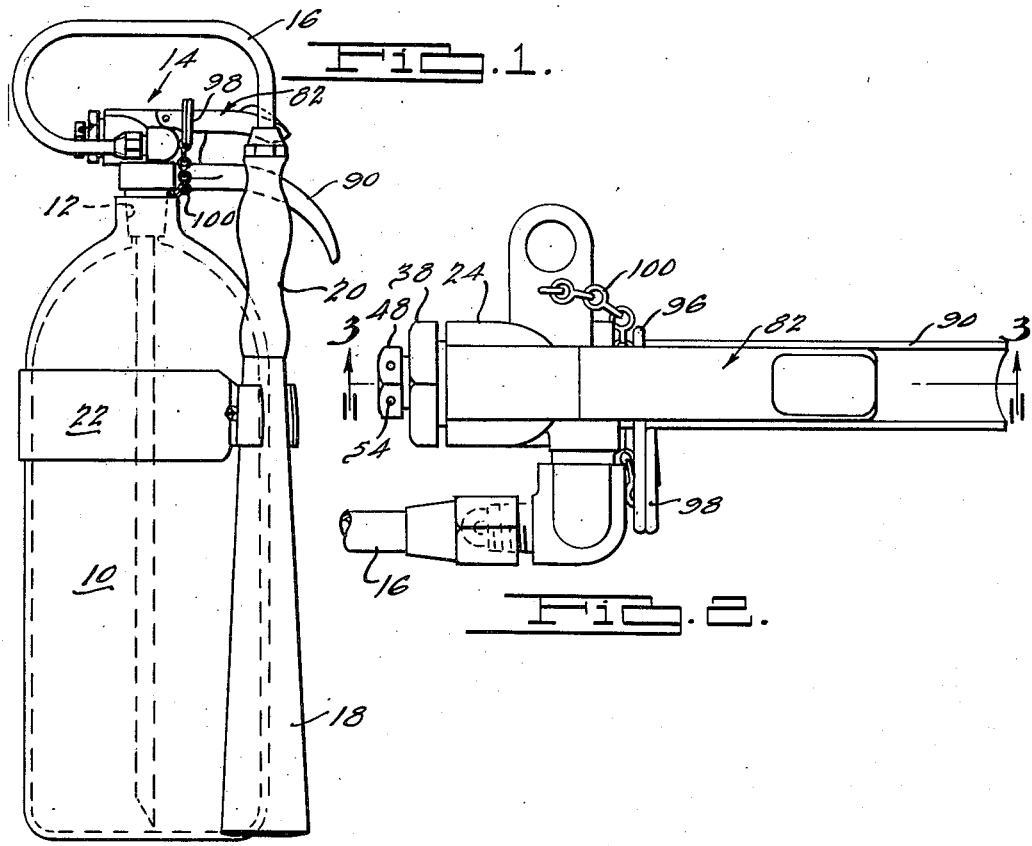
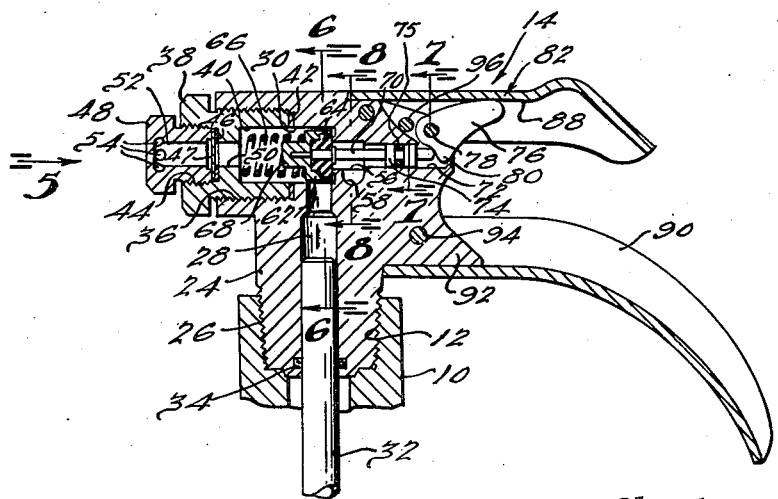
INVENTOR.
*Charles K. Huthsing.*
BY
*Harness, Dickey & Pierce*
ATTORNEYS.

Oct. 6, 1953  C. K. HUTHSING  2,654,396
VALVE
Filed July 28, 1950  2 Sheets-Sheet 2
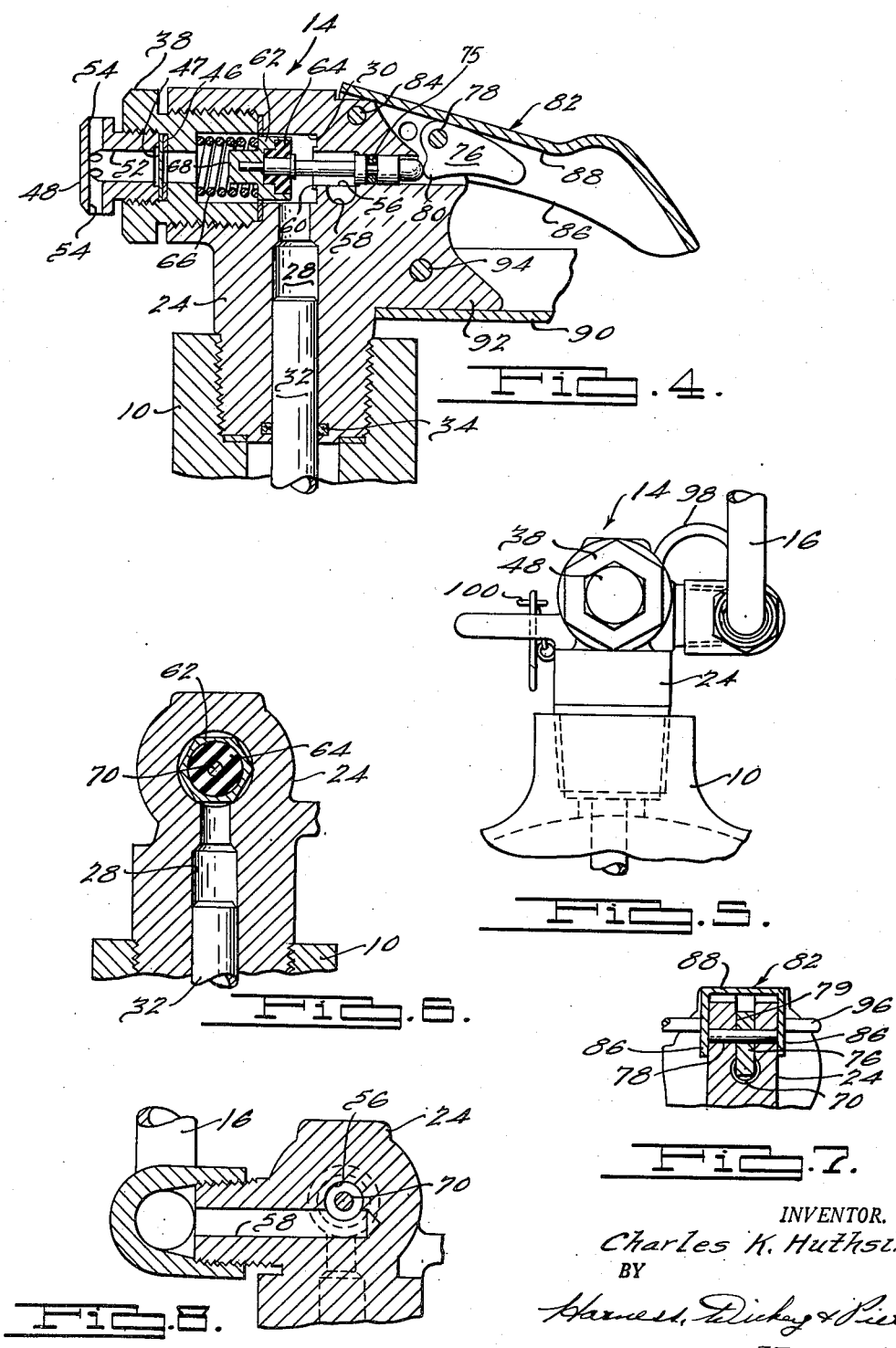
INVENTOR.
Charles K. Huthsing.
BY
Harness, Dickey & Pierce
ATTORNEYS.

Patented Oct. 6, 1953

2,654,396

UNITED STATES PATENT OFFICE 2,654,396

VALVE

Charles K. Huthsing, Los Angeles, Calif.

Application July 28, 1950, Serial No. 176,275

1 Claim. (Cl. 137—750)

The present invention relates to an improved discharge valve for containers for gases under high pressures.

It is an object of the present invention to provide an improved discharge valve of the above mentioned type which is simple in construction, economical of manufacture and reliable and efficient in operation.

Another object of the present invention is to provide an improved discharge valve of the above mentioned type which may be easily operated.

A further object is to provide such a discharge valve which, during unseating of the valve element, provides a maximum leverage ratio whereby only a limited pressure on the actuating lever is sufficient to provide the force required to unseat said valve element.

Another object is to provide such a discharge valve with a leverage ratio which progressively decreases after the valve element is unseated to provide an increasing movement of the valve element for a given movement of the actuating lever.

A further object of the invention is to provide such a discharge valve including a pivotally mounted actuating lever which is operatively connected to the valve element to provide a continuously changing leverage ratio whereby during unseating of the valve element a maximum force is applied to the valve element for a given force applied to the lever, and upon continued pivotal movement of the lever, a progressively increasing movement of the valve element is effected for a given unit of movement of the lever.

It is also an object of the invention to provide an improved and simplified discharge valve construction including a valve element retaining plug mounted in the valve body which supports the spring urging the valve element to its seated position and also carries a safety release disc and a plug holding the safety release disc in position.

Other and more detailed objects of the invention will become apparent from a consideration of the following specification, the appended claim and the accompanying drawings, throughout the several views of which like reference characters designate like parts; and wherein:

Figure 1 is an elevational view of a carbon dioxide type fire extinguisher having a discharge valve embodying the present invention;

Figure 2 is an enlarged plan view of the discharge valve shown in Figure 1;

Figure 3 is a broken sectional view of the structure illustrated in Figure 2, taken substantially along the line 3—3 thereof, showing the relative position of the parts with the valve element in the seated position;

Figure 4 is a view similar to Figure 3, showing the relative position of the parts for an unseated position of the valve element;

Figure 5 is a broken elevational view of the structure illustrated in Figure 3, taken in the direction of the arrow 5 in Figure 3; and, Figures 6, 7 and 8 are broken enlarged sectional views of the structure illustrated in Figure 3, taken substantially along the lines 6—6, 7—7 and 8—8 respectively, thereof.

It will be appreciated from a complete understanding of the present invention that the improvements thereof may readily be embodied in apparatus of widely differing type and constructions. In an illustrative but not in a limiting sense, the present invention is herein illustrated and described as embodied in a carbon dioxide type fire extinguisher.

Referring to the drawings, the fire extinguisher illustrated in Figure 1 comprises a conventional cylinder or container 10 having a tapped opening 12 at its top in which is mounted a discharge valve indicated generally at 14 and connected to a discharge hose 16 at the outer end of which is a conventional carbon dioxide applicator nozzle or horn 18 having a handle 20. When not in use the horn 18 is held by the ends of a band 22 mounted on the cylinder 10.

The discharge valve 14 includes a valve body 24 which has a downwardly extending threaded portion 26 adapted to be threaded into the tapped opening 12 to mount the valve body 24 on the cylinder 10. The valve body 24 has a vertically extending passage 28 extending downwardly through the threaded portion 26 and a horizontally extending passage 30 communicating with the upper end of the passage 28. A siphon tube 32 extends upwardly into the passage 30 and is supported therein by an O-ring 34 mounted in the wall of the passage 28.

At one end, the passage 30 communicates with a coaxial, cylindrical, and internally threaded recess 36 in which is mounted a threaded plug 38. The inner end of the plug 38 has a bore portion 40 forming an extension of the passage 30. A flat annular gasket 42 is mounted at the inner end of the plug 38. The outer end of the plug 38 has a centrally disposed internally threaded recess 44 in which are carried an annular gasket 46 and a frangible safety release disc 47 which are held against the inner end of the recess 44 by a safety release plug 48 threaded in the recess 44. The bore portion 40 communicates with recess 44 through a reduced central bore portion 50. At the inner end of the plug 48 is a central bore 52 communicating with a plurality of laterally extending apertures 54 opening outwardly through the sides of the plug 48.

At its opposite end the passage 30 communicates with a reduced bore portion 56 which in turn communicates with a transversely extending passage 58 leading to the discharge hose 16. The valve body 24 defines an annular valve seat 60 at the inner end of the bore portion 56 and projecting into the passage 30. An annular valve element 62 is mounted in the passage 30 for movement longitudinally thereof and carries an insert 64 of hard rubber or other suitable material adapted to sealingly engage said valve seat 60. The valve element 62 is urged toward its seated or sealing position by a coil spring 66, one end of which fits over a spring guide projection 68 at the end of the valve element 62 remote from the valve seat 60, and the other end of which abuts the plug 38 at the inner end of the bore portion 40.

Movement of the valve element 62 against the action of the spring 66 is effected by means of a pin 70, the inner end of which extends axially through the insert 64 and into the element 62. The pin 70 extends outwardly through the bore portion 56 and through the outer surface of the valve body 24. The pin 70 carries a pair of collars 74 movable in the bore portion 72 and supporting an O-ring 75 therebetween preventing the escape of gas through the bore portion 72.

Movement of the pin 70 inwardly against the action of the spring 66, to unseat the valve element 62 is effected through a cam member 76 pivotally mounted on the valve body 24 by a pin 78 disposed at right angles to and in spaced relation above the pin 70. The flat cam 76 is pivotable in a slot 79 communicating with the bore portion 72, and has a downwardly extending finger 80 engaging the outer end of the pin 70. Pivotal movement of the cam 76 is effected by an actuating lever 82 which is pivotally mounted on the valve body 24 by a pivot pin 84 disposed in parallel spaced relation to the pivot pin 78. The lever 82 is generally channel-shaped with the flanges 86 thereof fitting over the body 10 at opposite sides of the slot 79 and substantially concealing the cam member 76. The upper edge of the cam member 76 is engaged by the transverse or web portion 88 of the lever 82, as is clearly shown in Figures 3 and 4. The upper edge of the cam 76 is curved, as best illustrated in Figures 3 and 4, so that the engagement of the lever 82 with the cam member 76, when the valve element 62 is in its seated or sealing position illustrated in Figure 3, the force exerted by the lever 82 against the cam element 76 has a maximum moment arm about the pivot pin 78. During downward movement of the lever 82 as viewed in Figures 3 and 4, the engagement of the lever 82 with the cam member 76 progressively moves along the upper edge of the cam member 76 toward the pivot pin 78 so that as the valve element 62 approaches its full unseated position, the force exerted by the lever 82 against the cam member 76 has a minimum moment arm about the pivot pin 78. This condition is illustrated in Figure 4. From the foregoing it will be appreciated that by virtue of the illustrated construction a relatively small downward force applied to the lever 82 when the valve 62 is in the seated position, will result in the application of a relatively high force acting against the pin 70 tending to unseat the valve element 62. Also during this stage of the valve operation for a given unit of movement of the lever 82 a relatively small movement of the valve element 62 will be effected. As the downward movement of the lever 82 progresses, the force applied against the pin 70 for a given force supplied to the lever 82 progressively decreases and the movement of the valve element 62 corresponding to a given unit of the movement of the lever 82 increases accordingly.

The discharge valve 14 also is provided with a carrying handle which in the preferred embodiment illustrated is a fixed handle 90 which is channel-shaped and fits over a co-operating portion 92 of the valve body 24 and is secured thereto by a pin 94. This handle 90 serves as a reaction member which may be gripped by the fingers of the operator's hand while his thumb extends over the lever 82. By this construction the operator may readily apply to the lever 82 the downward force required to effect unseating of the valve element 62. It will also be appreciated that the above described construction provides a maximum leverage ratio during the unseating of the valve element 62, when a maximum force is required acting against the valve element 62 and then provides a progressively decreasing leverage ratio with a progressively increasing valve movement as the movement of the lever 82 continues. This permits a relatively short movement of the lever 82 to both provide ease of unseating the valve element and a full movement of the valve element to its retracted position.

The lever 82 is locked in the position illustrated in Figure 3 corresponding to the seated position of the valve element 62 by a locking pin 96 which extends through aligned apertures in the valve body 24 and the flanges 86 of the lever 82. The pin 96 is provided with a finger ring indicated at 98 for pulling the pin from the locking pin, best illustrated in Figures 3 and 7, and is permanently attached to the valve body 24 by a chain 100.

While only one specific embodiment of the invention has been illustrated and described herein, it will be readily appreciated by those skilled in the art that numerous modifications and changes may be made without departing from the spirit of the invention.

What is claimed is:

A discharge valve for a container for gases under high pressures, said valve comprising a valve body, a valve element movable between a seated and an unseated position, means yieldably urging said element toward its seated position, an actuator operable to unseat said valve element, a cam element pivotally mounted on said valve body and operatively engaging said actuator, a lever pivotally mounted on said valve body in spaced relation to the pivotal connection of said cam element to said body and having a continuously shifting engagement with said cam element during pivotal movement of said lever in a direction to unseat said valve and providing a rapidly decreasing leverage ratio between said lever and said actuator, the distance from the pivotal mounting of said lever to the point of engagement of said lever with said cam element being substantially greater than the distance from the pivotal mounting of said cam element to said point of engagement, and both of said distances being reduced by said shifting engagement during movement of said lever in said direction.

CHARLES K. HUTHSING.

References Cited in the file of this patent

UNITED STATES PATENTS

| Number | Name | Date |
| --- | --- | --- |
| 464,018 | Goubert | Dec. 1, 1891 |
| 1,397,987 | Sheppy | Nov. 22, 1921 |
| 1,671,179 | Beede et al. | May 29, 1928 |
| 2,383,961 | Freygang | Sept. 4, 1945 |
| 2,454,621 | Allen | Nov. 23, 1948 |
| 2,500,214 | Stroop | Mar. 14, 1950 |

FOREIGN PATENTS

| Number | Country | Date |
| --- | --- | --- |
| 365,667 | Great Britain | of 1932 |